United States Patent [19]

Denis

[11] Patent Number: 4,467,849
[45] Date of Patent: Aug. 28, 1984

[54] FELLING HEAD

[76] Inventor: Jean Denis, 623 Grand 5, Ste. Rosalie, Quebec, Canada, J0H 1X0

[21] Appl. No.: 383,275

[22] Filed: May 28, 1982

[30] Foreign Application Priority Data

Apr. 13, 1982 [CA] Canada .................................. 400835

[51] Int. Cl.³ .............................................. A01G 23/08
[52] U.S. Cl. ................... 144/34 R; 144/3 D; 144/336; 30/379.5; 83/488; 83/928
[58] Field of Search ................... 144/2 Z, 3 D, 34 R, 144/34 E, 335, 336; 83/471.1, 488, 928; 30/379.5

[56] References Cited

U.S. PATENT DOCUMENTS

| 776,743 | 12/1904 | Von Holdt | 144/34 R |
|---|---|---|---|
| 2,243,303 | 5/1941 | Wells | 83/488 |
| 2,341,035 | 2/1944 | Grzelak | 144/34 R |
| 3,379,227 | 4/1968 | Mason | |
| 3,664,391 | 5/1972 | Coffey | 144/34 R |
| 3,719,116 | 3/1973 | Burton et al. | 83/928 |
| 4,090,540 | 5/1978 | Smith | 144/34 R |

FOREIGN PATENT DOCUMENTS

| 898661 | 4/1972 | Canada . |
| 931048 | 7/1973 | Canada . |
| 1029283 | 4/1978 | Canada . |

Primary Examiner—W. D. Bray
Attorney, Agent, or Firm—Schwartz, Jeffery, Schwaab, Mack, Blumenthal & Koch

[57] ABSTRACT

A felling head for use in harvesting trees. The felling head carries a pair of circular saws and means for positioning and gripping a tree to be felled. The saws are rotated and moved relative to the positioning and gripping means to, between them, cut through a positioned and gripped tree.

5 Claims, 4 Drawing Figures

FELLING HEAD

BACKGROUND OF THE INVENTION

This invention is directed toward an improved felling head for use in harvesting trees.

The invention is more particularly directed toward an improved felling head employing two adjacent circular saws to cut a tree to be harvested.

Felling heads with tree cutting means are well known. Many felling heads employ shears to cut through a tree. The use of shears however often results in splinter damage to the cut tree at its butt end and leads to high wastage. It is also known to employ felling heads having chainsaws to cut trees. The chainsaws minimize the problem of damaging the butt end of the cut tree but they are expensive to operate and service and binding problems are often encountered in using chainsaws.

It is also known to employ harvesting machines with a single, large circular saw to cut through the tree to be harvested. Examples of such machines are shown in Canadian Pat. No. 898,661 or Canadian Pat. No. 1,029,283. In such machines however, the saw must be both quite large in diameter and quite thick. As a result, the saw is very heavy and requires a relatively large amount of power to operate it. The thick circular saws waste wood in cutting through a tree. The large, heavy circular saws are also difficult to service and/or replace. The teeth on the saw often break when the saw strikes ground or a rock. Because of the size of the saw, replacement costs are high. The known circular saws are fixed in one position on the harvesting machine. Thus the rate of tree harvesting is limited by the manoeuverability of the harvesting machine. Special steps must also often be taken to avoid binding during operation of the saw which increases the cost of such saws.

SUMMARY OF THE INVENTION

It is the purpose of the present invention to provide an improved felling head with tree cutting means which overcomes, or at least minimizes, many of the problems associated with the known tree cutting means. In accordance with the present invention, there is provided a felling head employing a pair of circular saws for cutting a tree between them. The saws are mounted on movable means on the felling head. Movement of the movable means toward the tree will cause the two circular saws to cut through the tree between them.

Because each saw needs to cut through only a part of a tree, the two saws employed are quite small in diameter and quite thin compared to the known single circular saws. As a result, the two saws weigh much less than a single saw. Thus the felling head carrying the saws is lighter in weight and less power is required to operate the two saws than the power required to operate a single saw. The thinner small saws waste less wood in cutting through a tree than a single, thick large saw. The small saws are also easier to service and/or replace and considerably less costly. In addition, since the two saws cut through the tree from opposite sides, the problem of binding is minimized.

The invention is particularly directed toward a felling head for use in harvesting trees which head includes two circular saws mounted adjacent each other. Means are provided to rotate the saws and to move the rotating saws to saw a tree between them.

The invention is also particularly directed toward a felling head for use in harvesting trees which head includes means to position and grip a tree and two circular saws to cut the positioned and gripped trees. The two saws are mounted adjacent each other. Means are provided to rotate the saws and to move the rotating saws relative to the tree positioning and gripping means to saw a tree between them.

DESCRIPTION OF THE PREFERRED EMBODIMENT

Figure 1:
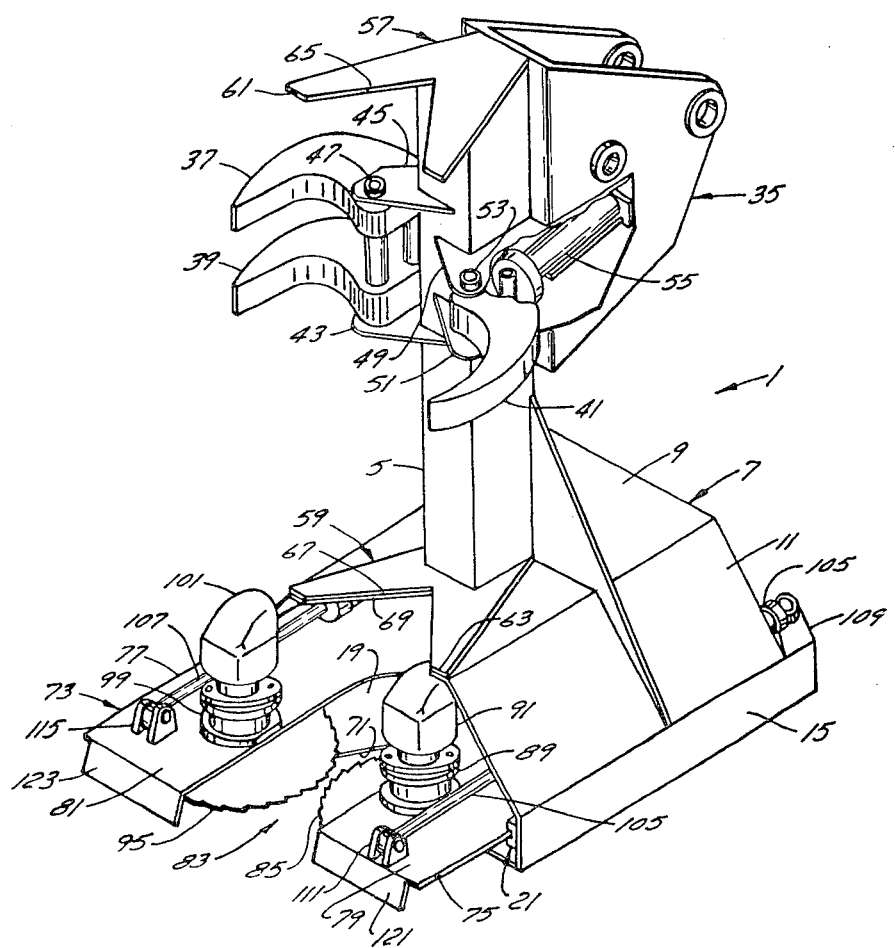
FIG. 1 is a perspective view of the improved felling head of the present invention with the saws in a forward position.
Figure 4:
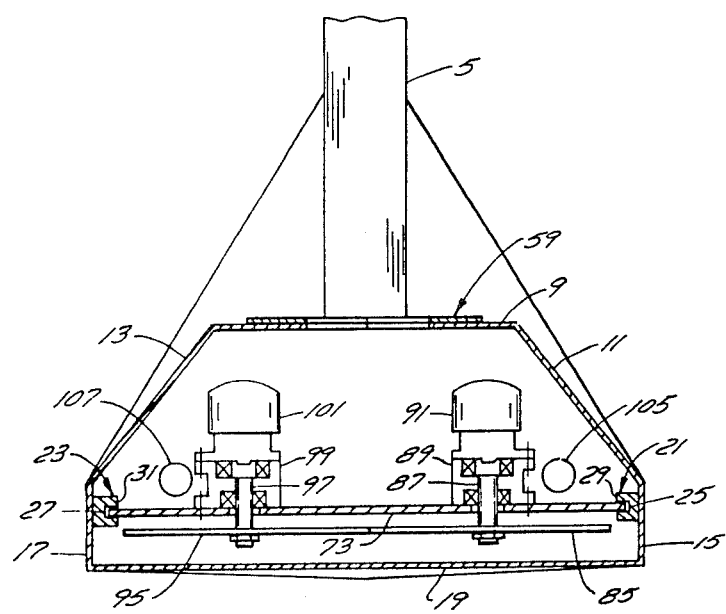
FIG. 4 is a cross-section view taken along line 4—4 of FIG. 2.

The felling head 1 of the present invention, as shown in FIG. 1, has a vertical post 5 and saw mounting means fixed at the bottom end of post 5. The saw mounting means comprises an enclosure or cover 7 having as shown in FIGS. 1 and 4, a top wall 9; downwardly and outwardly sloping side walls 11, 13; and vertical side walls 15, 17. The bottom end of post 5 is fixed to top wall 9 of cover 7. A reinforced bottom wall 19 can extend between the bottom edges of vertical side walls 15, 17 as shown in FIG. 4. An elongated guide bar 21, 23 is horizontally mounted on the inside of each vertical side wall 15, 17 respectively. Each guide bar 21, 23 has a horizontal guide slot 25, 27 respectively in its inwardly facing side 29, 31. The slots 25, 27 lie in the same horizontal plane and face each other.

Bracket means 35 are provided on the back side of post 5 near its top end for use in operatively connecting the felling head 1 to the end of a boom (not shown) of a harvesting machine (not shown). The post 5 also carries means for gripping a tree while cutting it. The gripping means and its operation is well known. The gripping means, as shown in FIG. 1 comprise a pair of vertically spaced-apart curved gripping arms 37, 39 mounted on one side of the post 5 near its top end and a single curved gripping arm 41 mounted on the other side of the post 5. Arms 37, 39 are pivotably mounted on brackets 43, 45 by a pivot pin 47. Arm 41 is pivotably mounted on brackets 49, 51 by a pivot pin 53. Suitable hydraulic actuators 55, one of which is shown, swing the arms 37, 39 and 41 toward or away from each other about pins 47, 53 to grasp or release a tree. When the arms 37, 39 and 41 are moved together to grip a tree, arm 41 moves in between arms 37, 39. This meshing arrangement helps to more firmly hold the tree after it has been cut. A pair of accumulator arms (not shown) could also be mounted on the post 5 to gather a plurality of trees cut by the felling head 1 prior to transferring the cut trees to a collecting area. The accumulator arms are also well known in the tree harvesting art.

Tree positioning means are also mounted on the post 5. The tree positioning means, as shown in FIG. 1, comprise a pair of positioning plates 57, 59. One plate 57 is mounted on top of post 5 and projects forwardly therefrom. The other plate 59 is mounted on post 5, on the top wall 9 of the cover 7. Plate 59 also projects forwardly of post 5. The front edge 61, 63 of plates 57, 59 respectively are V-notched inwardly as shown at 65, 67 respectively. The top wall 9 of saw mounting means 7 is also V-notched inwardly as shown at 69 to match the notch 67 on plate 59 as is the bottom wall 19 of cover 7 as shown at 71 in FIG. 2. The felling head 1 is moved by the boom of the harvesting machine to position a tree in the notches 65, 67. Once in the notches, the tree is securely gripped by arms 37, 39 and 41. The notches 65, 67 and gripping arms 37, 39 and 41 centrally position the tree to be cut relative to the tree cutting means carried by the felling head 1. The felling head 1 could be used with the gripping means only, or with the positioning means only. However for best results it is preferred that the felling head includes both the gripping means and the positioning means.

Figure 2:
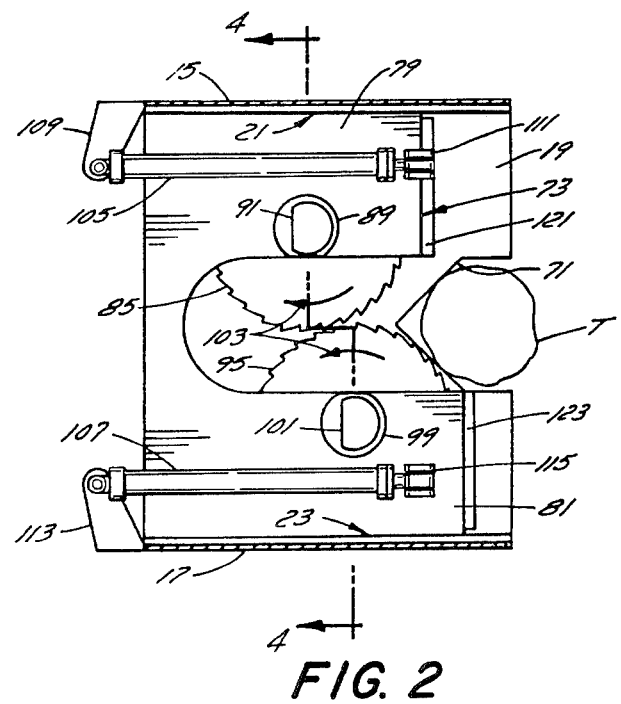
FIG. 2 is a plan view of the bottom portion of the felling head showing the saws in a retracted position.
Figure 3:
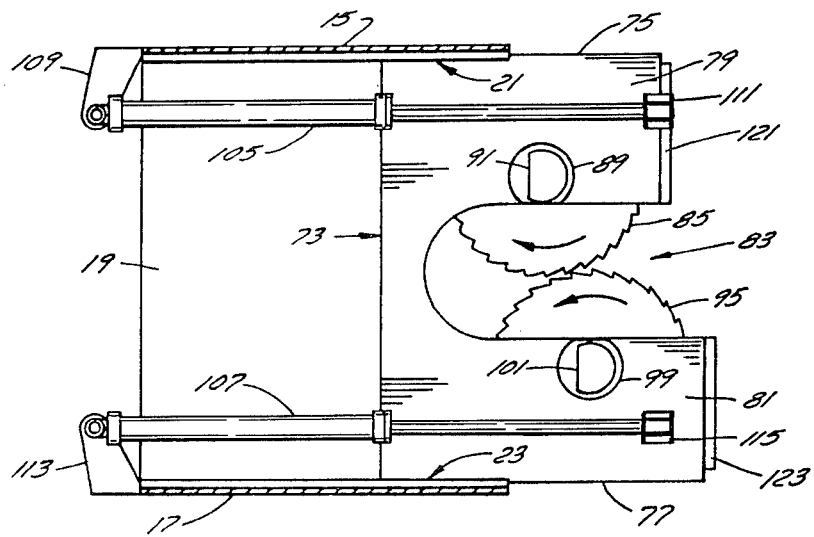
FIG. 3 is a view similar to FIG. 2 showing the saws in a forward position.

The tree cutting means on the felling head 1 includes saw carrying means. The saw carrying means as shown in FIGS. 2 and 3, preferably comprises a flat plate 73. The plate 73 is mounted for sliding movement in the guide bars 21, 23 on the saw mounting cover 7. The side edges 75, 77 of the plate 73 are located in the slots 25, 27 in the guide bars 21, 23. The front of the plate 73 is shaped to provide two parallel legs 79, 81 defining a central slot or gap 83 between them. One leg 81 is slightly longer than the other leg 79.

A first circular saw 85 is mounted on leg 79 near its front end and adjacent gap 83. The saw 85 is mounted on a vertical drive shaft 87 as shown in FIG. 4 and is located adjacent the bottom side of plate 73 and parallel to it. The drive shaft 87 extends up through a hole in plate 73 and is rotatably mounted in a bearing box 89. A hydraulic motor 91 is mounted on top of bearing box 89 and is operatively connected to the drive shaft 87 to rotate the saw 85. A second circular saw 95 is mounted on the leg 81 near its front end and adjacent gap 83. Saw 95 is also mounted on a vertical drive shaft 97 and is located adjacent the bottom side of the plate 73 and parallel to it. The drive shaft 97 extends up through a hole in the plate 73 and is rotatably mounted in a bearing box 99 fixed to the top of plate 73. A hydraulic motor 101 is mounted on top of the bearing box 99 and is operatively connected to the shaft 97 to rotate the saw 95.

Both saws 85, 95 are located in the same horizontal plane with saw 95 slightly ahead of saw 85, as shown in FIG. 2. Each saw 85, 95 also extends into gap 83 a distance just slightly greater than one-half the width of gap 83 so as to provide overlapping cutting paths. The saws 85, 95 are rotated by motors 91, 101 in a direction to have the teeth on each saw, while in the gap 83, moving toward the post 5 as shown by arrows 103 in FIG. 2.

Means are provided for moving the plate 73, carrying the saws 85, 95, forwardly and rearwardly relative to post 5. The moving means comprise a pair of hydraulic actuators 105, 107. One actuator 105 is pivotably mounted at one end to a bracket 109 fixed to the rear end of the side wall 15 of saw mounting means 7. The other end of the actuator 105 is pivotably mounted to a bracket 111 fixed to the front end of leg 79. Actuator 105 extends through cover 7, parallel to side wall 15. The other actuator 107 is similarly pivotably mounted to brackets 113, 115 on the rear end of the other side wall 17 and the front end of the other leg 81 respectively. Actuator 107 extends through cover 7, parallel to side wall 17 and actuator 105. Operation of the actuators 105, 107 will slide plate 73, and thus saws 85, 95 forwardly and rearwardly relative to post 5, positioning plates 57, 59 and gripping arms 37, 39 and 41. A bumper plate 121, 123 can be provided on the front end of each leg 79, 81 of plate 73. The plates 121, 123 extend down from legs 79, 81 below the plane containing saws 85, 95. The plates 121, 123 help to protect saws 85, 95 during use by moving rocks and/or earth out of the path of the saws when plate 73 is moved forwardly. It will also be noted that when plate 73 is in its withdrawn position, the saw motors 91, 101 are located within cover 7 where they are protected.

When the felling head 1 is being used, the saws 85, 95 are continually rotated by motors 91, 101. The felling head 1 is moved by the boom to position a tree "T" to be harvested in the notches 65, 67 in plates 57, 59, while plate 73 is withdrawn to the rear of felling head as shown in FIG. 2. When the tree "T" is located in the notches 65, 67 it is generally centrally located with respect to gap 83 in plate 73 since the gap 83 is vertically aligned with notches 65, 67. The gripping arms 37, 39 and 41 are then actuated to tightly hold the tree "T" in the notches 65, 67 and plate 73 is then moved forwardly by actuators 105, 107 to have the rotating saws 85, 95 cut the held tree "T" between them. The gap 83 accomodates tree "T" when plate 73 is moved toward the tree "T". After the tree "T" has been cut, the actuators 105, 107 move the plate 73 rearwardly. If the cut tree "T" has slipped downwardly slightly after cutting, the continuously rotating saws 85, 95 merely cut through the tree again on the return stroke. The return stroke can be arranged to occur automatically on completion of the forward stroke. The felling head 1 then moves the cut tree "T" to a storage position and is repositioned to cut the next tree.

The two saws 85, 95 require much less power to operate than a single large saw. Since the two saws 85, 95 cut through the tree from each side generally at the same time, the problem of saw binding is much less than if a single saw were used. It will be seen that the arrangement permits the saws to be easily serviced and/or replaced.

The hydraulic motors 91, 101; the gripping arm actuators 55; and the plate actuators 105, 107 all are operated by hydraulics supplied through suitable lines from a hydraulic source on the harvesting machine carrying the felling head.

I claim:

1. A felling head for use in harvesting a stand of trees, the felling head having: means to position a tree to be cut; saw mounting means beneath the positioning means; a saw-carrying member movably mounted on the saw mounting means; the saw-carrying member having a pair of forwardly directed legs spaced apart to define a tree receiving slot therebetween; a circular saw mounted on the inner side of each leg and extending halfway into the slot to lie adjacent the other saw; means for rotating each saw; means for moving the saw-carrying member forwardly of the saw mounting means to saw through a tree positioned in the slot with both saws; each saw having a diameter generally half the diameter of the smallest single saw that would be needed to saw the same trees in the stand.

2. A felling head as claimed in claim 1 wherein the two saws are mounted in the same plane with their axis of rotation parallel to each other, and with one saw slightly ahead of, and partially overlapping, the other saw.

3. A felling head as claimed in claim 1 wherein the positioning means comprise tree gripping means.

4. A felling head as claimed in claim 2 wherein the positioning means comprise a pair of vertically spaced-apart notched plates aligned with the slot in the saw-carrying member.

5. A felling head as claimed in claim 2 including a cover on the saw mounting means, the saw-carrying member being movable forwardly from a start position where the saw rotating means are beneath the cover.

* * * * *